INVENTOR.
HUBERT C. VYKUKAL

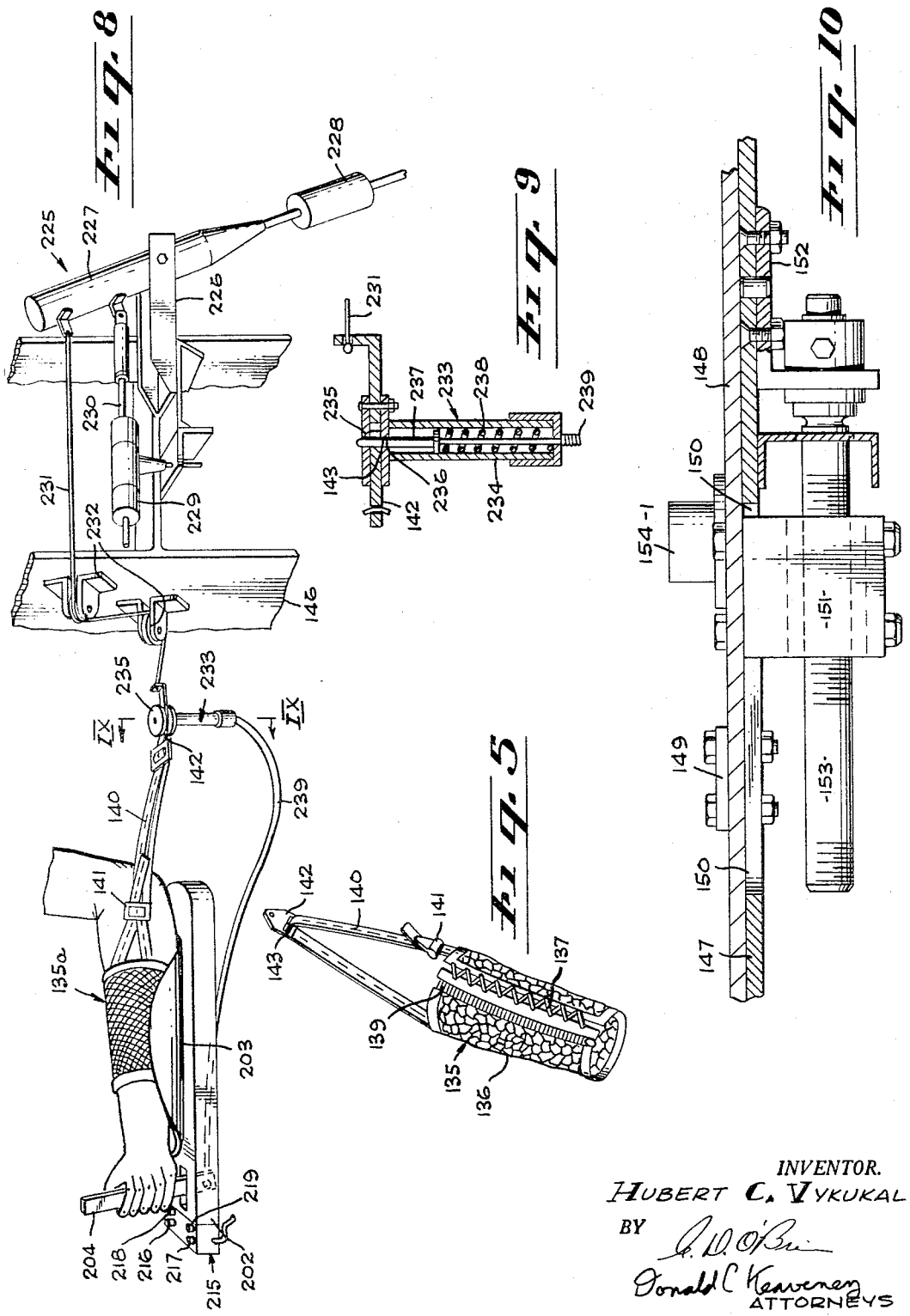

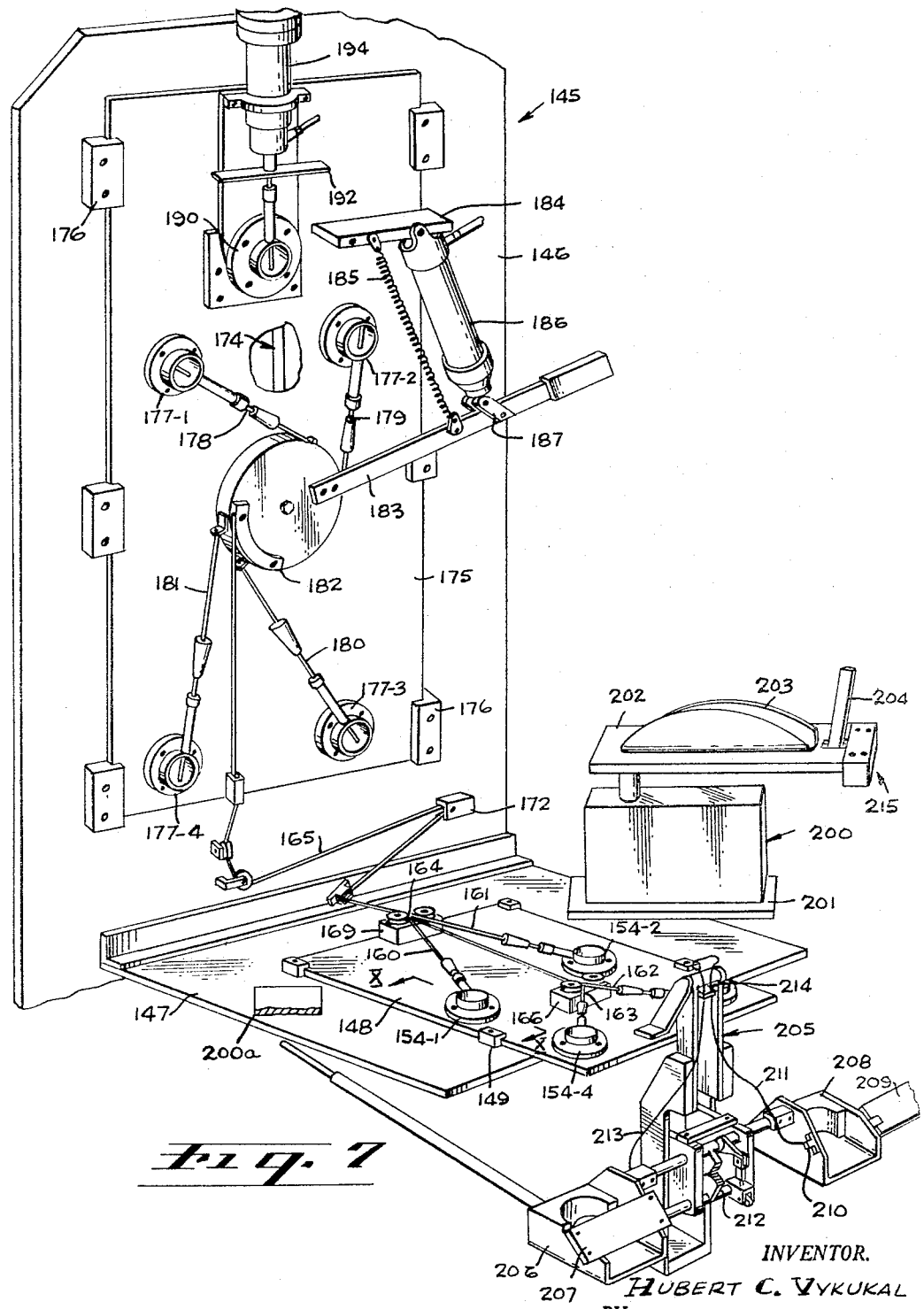

United States Patent Office 3,302,633
Patented Feb. 7, 1967

3,302,633
UNIVERSAL PILOT RESTRAINT SUIT AND
BODY SUPPORT THEREFOR
Hubert C. Vykukal, Mountain View, Calif., assignor to the United States of America as represented by the Administrator of the National Aeronautics and Space Administration
Filed Dec. 12, 1961, Ser. No. 158,916
30 Claims. (Cl. 128—1)

The invention described herein may be manufactured and used by or for the Government of the United States of America for governmental purposes without the payment of any royalties thereon or therefor.

This invention relates to a combination pilot restraint suit and body support structure, and more particularly to a universal combination the basic structure of which will adapt to variously sized pilots.

To date, restraint systems have consisted, essentially, of a contoured couch individually moulded to the shape of a particular pilot's body and a strap arrangement for securing the body to the couch. The contoured couch provides support for the posterior portion of the body, the anterior part of the body being restrained by a shoulder harness, a lap belt and a strap arrangement which fits over the pilot's knees. This arrangement, which was used in Project Mercury, places the couch so that the deceleration and acceleration vectors are transverse to the spinal axis of the pilot thereby maximizing the individual's tolerance to acceleration.

The above mentioned prior art restraint systems has functioned satisfactorily; however, it has many disadvantages. One obvious disadvantage is that a contoured couch must be constructed for each astronaut or space pilot. This, of course, means that a mould must be made of each astronaut's body from which the couch can be formed. This is a very expensive method of providing support for the posterior portion of the astronauts body. Within the foreseeable future the number of astronauts will increase to the point where this method of support will no longer be economically feasible. In addition, it should be pointed out that each time a different astronaut uses a space capsule or vehicle, it is necessary to change the contoured couch to fit the particular pilot. This entails considerable work and the expenditure of many manhours which would otherwise be profitably utilized. This problem is particularly prevalent where the existing restraint system is utilized with a centrifuge type simulator. Oftentimes several astronauts or trainees may utilize a simulator in the course of a day or week. This means that the proper contour couch must be installed for each individual.

Another disadvantage of existing restraint systems is that of ingress and egress. It is difficult, if not impossible, for the astronaut to strap himself to the contoured couch, and considerable difficulty is encountered in unbuckling the straps to free the astronaut. The unbuckling process also consumes a considerable amount of time. The time factor may become very important in saving the astronaut's life as has been witnessed in a recent space flight.

The restraint system of the present invention has solved many of the above problems. With this invention a contoured couch is no longer necessary. The support for the posterior portion of the body is provided for by a rigid chair-like structure which is utilized in combination with an attirable restraint suit also having rigid support structure which may be attached to the chair-like member. The suit is fitted to various sized pilots by inflatable bladders which automatically form to the configuration of the pilot body. The various components of the restraint suit are also connected together in a manner that provides for ease of fitting the suit to the pilot. Structure is provided on the rigid body support member for aligning the attachment structure thereof with that of the restraint suit head, back and thigh connections.

The attachment means between the restraint suit and the body support structure includes a latching arrangement whereby the astronaut may be quickly connected to or separated from the body support member providing for rapid ingress and egress.

A novel forearm restraint system is utilized with the present suit. It has the features of restraining the arm when under back-to-chest accelerations and vice versa, but also providing freedom of movement to manipulate controls.

It is therefore an object of this invention to provide a pilot restraint system which will fit a wide range of pilot sizes.

Yet another object of this invention is to provide a restraint system which will allow the pilot to be quickly connected to and disconnected from the main support structure.

Yet another object of this invention is to provide a restraint system which will allow adequate movement of the pilot for performing all flight functions.

Another object of this invention is to provide a restraint system which will supply adequate restraint over a wide range of back-to-chest, chest-to-back, and chest-to-feet accelerations, as well as any combination thereof.

Yet another object of this invention is to provide a restraint system which will be compatible with the required respiratory and cardiovascular measurements being contemplated.

Still another object of this invention is to provide a restraint suit which is readily attirable.

Another object of this invention is to provide a restraint system wherein the weight and bulk thereof is held to a minimum.

These and other objects and advantages of the invention will become more apparent upon reading the specification in conjunction with the accompanying drawings.

In the drawings:

FIG. 5 is a perspective view of the forearm restraint cuff;

FIG. 6 is an enlarged perspective view showing a connector and three bar fastener associated therewith;

FIG. 7 is a perspective view showing the main portion of the body support structure and the receptacles including the latching systems;

FIG. 8 is a perspective view showing the forearm restraint mechanism as associated with the body support structure partially shown;

FIG. 9 is a cross sectional view taken along the section lines IX—IX of FIG. 8;

FIG. 10 is a cross sectional view taken along the section lines X—X of FIG. 7; and FIG. 11 is a cross sectional view taken along the section lines XI—XI of FIG. 4.

Figure 1:
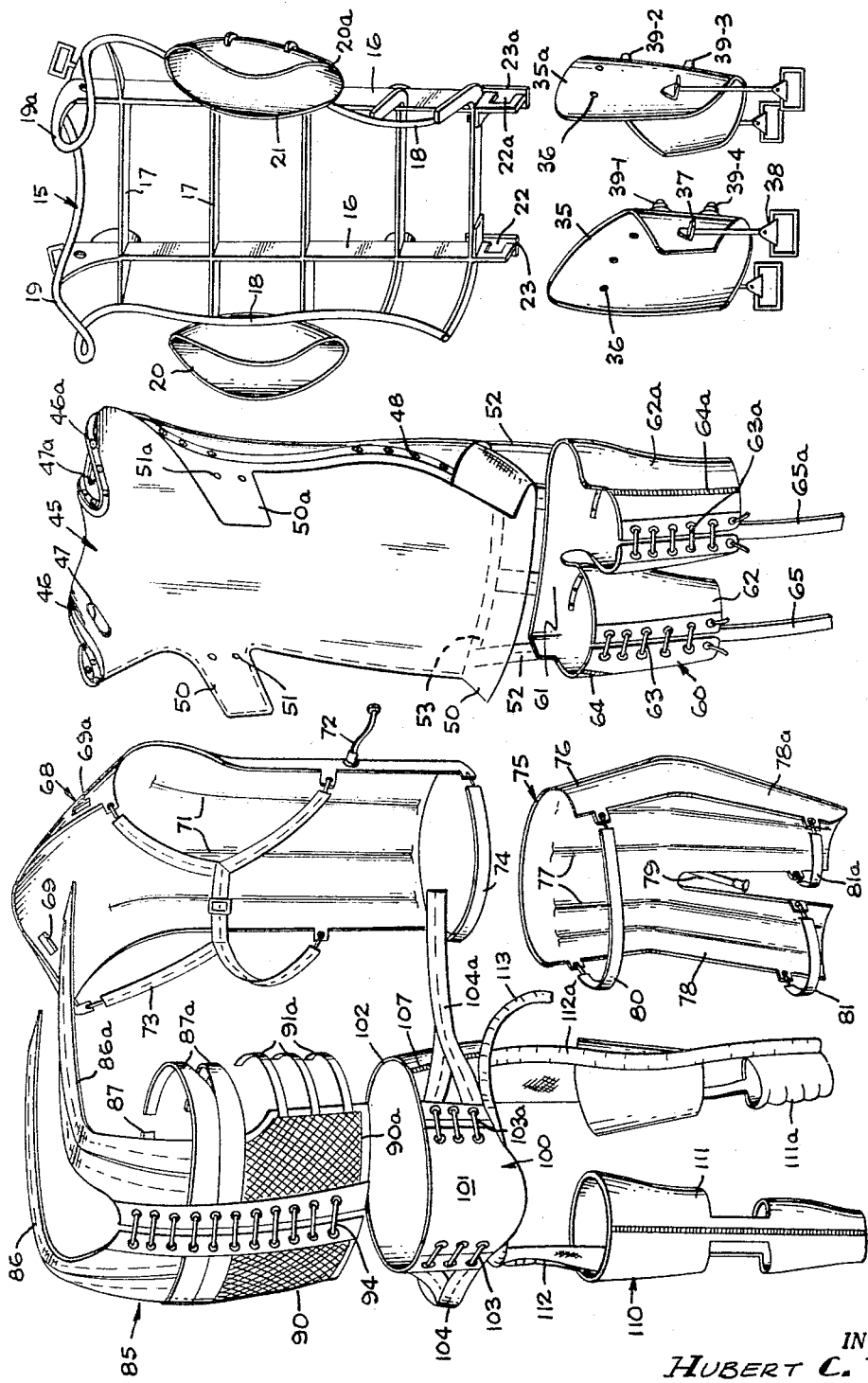
FIG. 1 is an exploded view showing the major components of the restraint suit in perspective.

Basically, this invention relates to a pilot restraint system which is of a universal nature in that the basic structure can be adapted to fit various sized pilots. The restraint suit proper includes a rigid back frame member which is generally contoured to the posterior of a pilot's torso. The back frame carries upper arm restraints. A cover is laced to the back frame, and suspended therefrom by seat straps are rigid thigh supports. An inflatable upper bladder member fits between the back frame cover and the pilot, and a lower inflatable bladder member fits between the thigh supports and the thighs and buttocks of the pilot. A bib restraint and pelvic restraint surround the anterior part of the pilot's body and are strapped to or about the rigid back frame to complete the torso portion of the restraint suit. Thigh covers attached to the thigh support surround the upper portion of the thighs fixing this portion of the restraint suit to the pilot. Knee restraint assemblies are suspended from the thigh support. Forearm restraints are cuff-like members which surround the pilot's forearms. The helmet is of the type utilized in space flight. Connectors are formed integral with the back frame and thigh supports at various points and function to attach the restraint suit to the body support structure. The helmet also carries a connector.

The body support structure is of a chair-like design having a back support area, a thigh support area and arm rests. The back and thigh support areas have movable sections which carry receptacles alignable with the connectors fixed to the back frame and thigh supports. Latching structure is associated with the receptacles and provides means for fixing the restraint suit with respect to the body support structure. Operator means are associated with the latching means to provide for quickly connecting the pilot to or separating him from the body support structure. Counterweight assemblies are connected to the forearm restraint cuffs to provide for forearm restraint. Restraint mechanism for the pilot's feet is also associated with the body support structure.

The restraint system, which is designated generally 10, has two major components, the restraint suit 12 and the restraint chair or body support member 145. The suit 12 includes the back frame 15, the thigh supports 35 and 35a, the back cover 45, the thigh cover 60, the upper bladder 68, the lower bladder 75, the restraint bib 85, the pelvic restraint 100 and the knee restraints 120 and 120a. The helmet 130 and forearm restraint cuffs 135 and 135a form part of the restraint suit, but are separate members. The restraint chair 145 includes the back 146, the seat 147, the arms 200, the foot pedals 206, and the forearm restraint mechanism 225.

Figure 2:
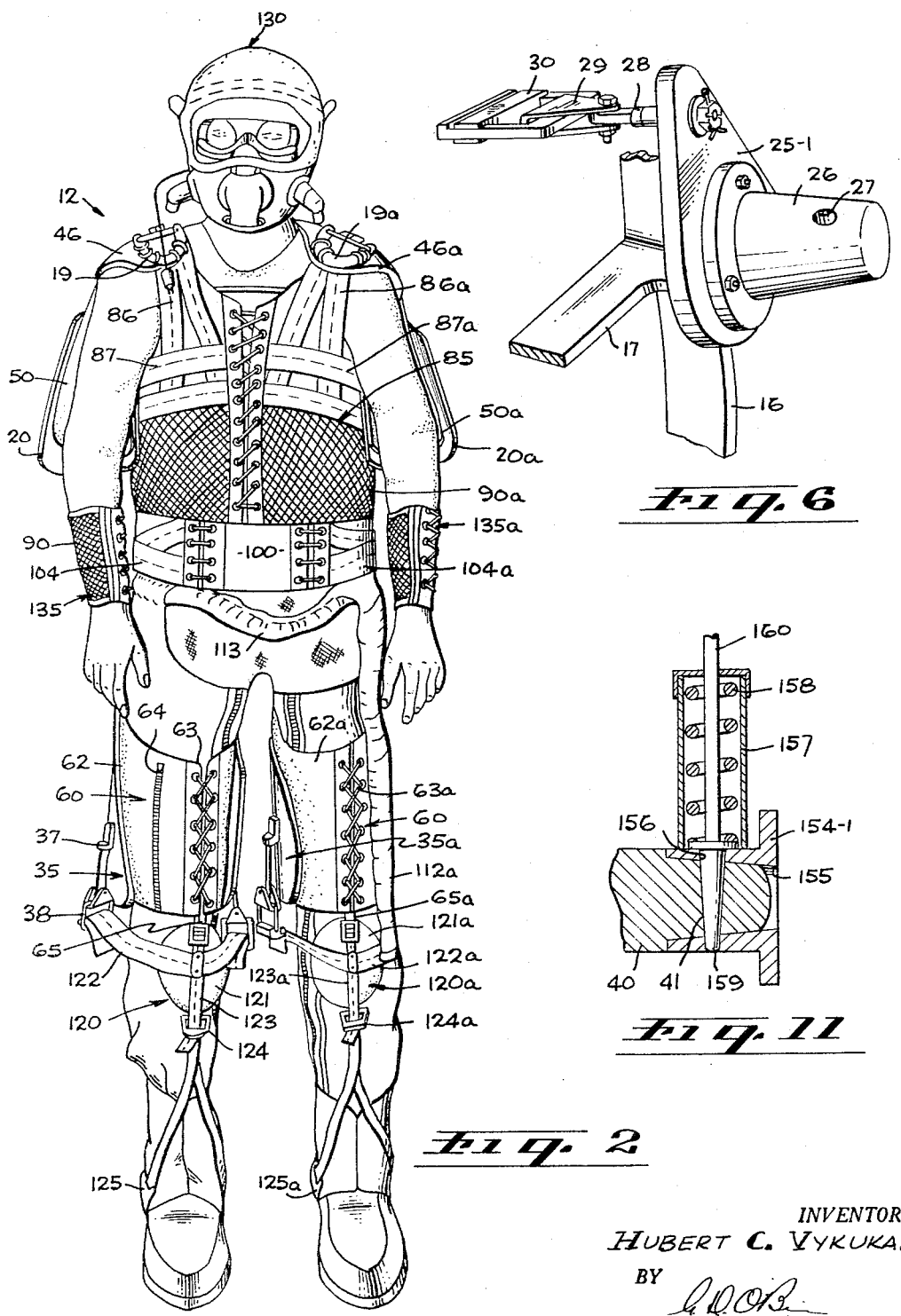
FIG. 2 is a front elevational view showing the pilot restraint suit worn by a pilot or astronaut.
Figure 3:
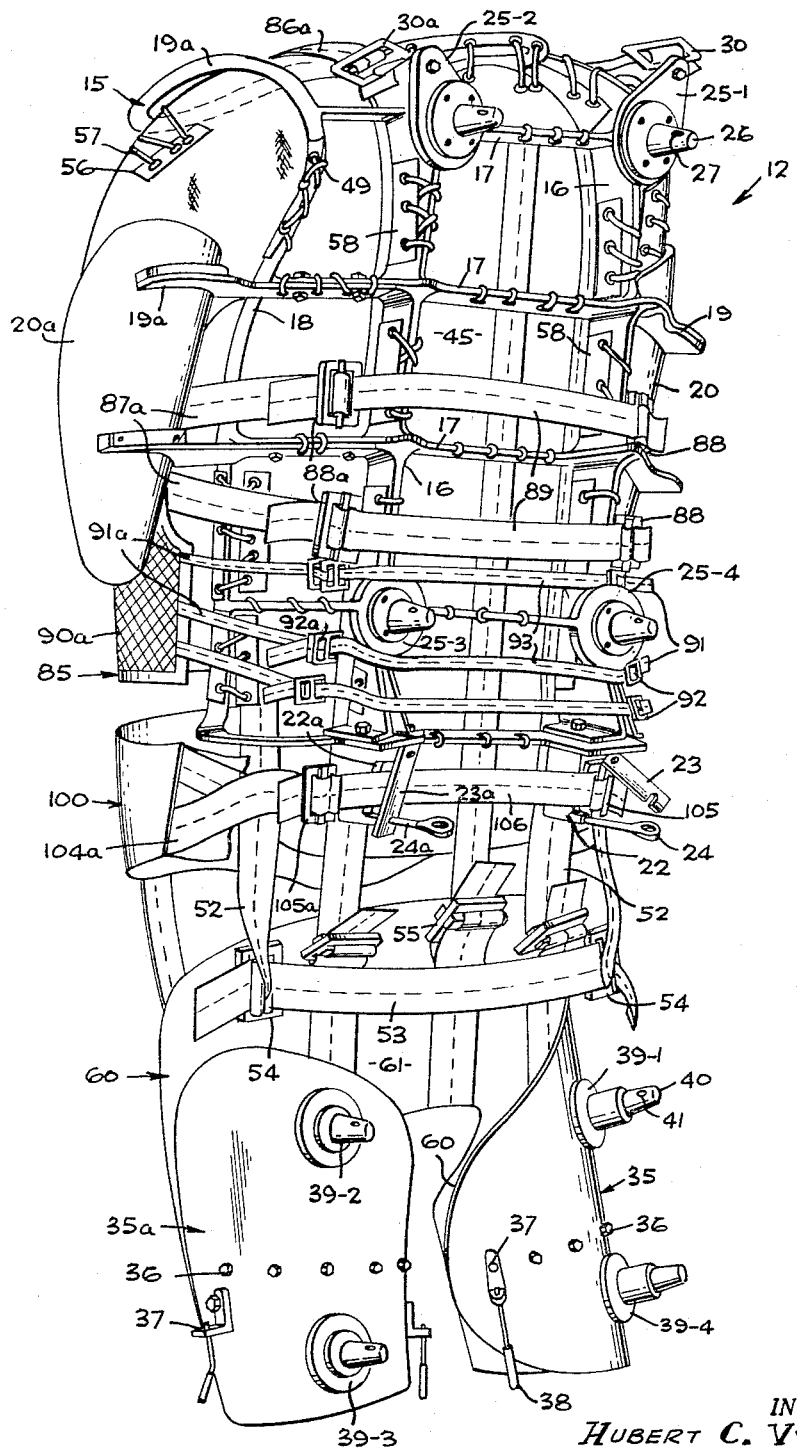
FIG. 3 is a perspective view showing an assembly of the back or posterior portions of the major components of the restraint suit.

Referring now more specifically to the details of the invention, FIGS. 1 through 3 best illustrate the restraint suit 12 now to be described.

The basic component of the restraint suit 12 is the back frame 15. The back frame 15 has two upright stringers 16 which are spaced generally along an imaginary vertical line drawn through the shoulder blades of the pilot. The upright stringers 16 are inner-connected with a series of lateral stringers 17 which are positioned at spaced intervals starting from the base of the torso and terminating at approximately the neckline of a pilot. The lateral stringers 17 are of an expanded U-shape, being designed to partially enclose the posterior of the upper torso. Connected to the ends of the lateral stringers 16 is a continuous contour rail 18. It starts on one side of the base of the frame and continues upwardly to the neckline then forms a loop outwardly, is directed inwardly around the neck and then again outwardly to form another loop, then downwardly to the base of the back frame. The loops or projections are designed to partially overlap the shoulders to provide shoulder restraint under a feet-to-chest force. The upper portions of the upright stringers are hook-shaped to overlap the shoulders and connect to the projections for reinforcement. The back frame stringers and rails are constructed from aluminum or some other lightweight material to hold the weight to a minimum. Arm projections 19 and 19a are bolted on two of the intermediate lateral stringers 17 and extend beyond either side of the back frame 15. Upper arm restraints 20 and 20a are fixed to the arm projections 19 and 19a respectively. These restraints are generally of an elongated, trough-shaped configuration designed to fit the upper arm and are padded to provide the proper cushion for the upper arms under acceleration and deceleration forces. These restraints are constructed from a material such as Fiberglas or some other light-weight material which is easily formed and provides the necessary rigidity.

The outside edge of the base of each upright stringer 16 is notched to form strap slots 22 and 22a (FIG. 3). The strap slots 22 and 22a are adapted to receive a strap of the pelvic restraint assembly 100 to be explained more fully hereinafter. Gates 23 and 23a pivotally mounted on the upright stringers 16 are positioned to cover the slots and retain the above-mentioned straps. The gates 23 and 23a are secured in the closed position by the clamping screws 24 and 24a.

Connectors 25–1, 25–2, 25–3 and 25–4 are fixed to the back frame 15 in a conventional manner to form an integral part of the back frame. These connectors are all basically similar in design. Therefore, only the connector 25–1 will be explained in detail. FIG. 6 best illustrates the connector 25–1 which has a base portion from which projects the tapered male plug 26. The plug 26 is provided with a latch pin aperture 27 which extends transversely therethrough. The connectors 25–1 and 25–2 are positioned over the shoulder blade area, and the connectors 25–3 and 25–4 in the lower back region. These connectors are fixed at junctions of the vertical stringers 16 and lateral stringers 17 to provide maximum design strength.

Referring again to FIG. 6, the three bar fastener 30 is shown associated with the connector 25–1. A toggle bolt 28 is fixed to the connector 25–1 and projects from the rear of the connector. A clevis 29 is fixed to the toggle bolt 28 by a bolt fastener and surrounds one of the bars of the three bar fastener 30 to assemble it to the connector. The three bar fastener 30 receives the shoulder straps of the bib restraint 85 to be explained more fully hereinafter. A similar three bar fastener 30a is assembled to the connector 25–2 as shown in FIG. 3.

Thigh supports 35 and 35a are shown in FIG. 1. Since these members are substantially identical, only the thigh support 35 will be explained in detail. It is a generally trough-shaped member formed from a material such as plastic or Fiberglas or some other rigid lightweight material. The one end of the thigh support is tapered to prevent the possibility of the member cutting into the buttocks of a pilot. Fasteners 36 are positioned along a line inwardly from the tapered end at spaced intervals to provide for fastening a thigh cover 60 to be explained more fully hereinafter. Stirrup brackets 37 are fixed to the outer surface of the thigh support 35 opposite the tapered end. Stirrups 38 are suspended from the brackets 37 by cables and receive the straps of a knee restraint assembly 120 also to be explained more fully subsequently. Also fixed to the thigh support 35 are seat connectors 39–1 and 39–4. These are located intermediate the sides of the thigh support and at spaced intervals on the bottom thereof. The connectors 39–2 and 39–3 are located similarly on the thigh support 35a. Since these connectors are similar to the connector 25–1, they will not be explained in detail.

The cover 45 (FIG. 1) is a heavy nylon member. It has the general configuration of a half jacket being cut generally to the shape of the body. The shoulders extend forwardly to form shoulder projections. Each projection is provided with an aperature 47 and 47a respectively, to allow the shoulder straps of the restraint bib 85 to pass therethrough and connect to the three bar fasteners 30 and 30a. The edges of the cover 45 are provided with eyelets which receive cord 49 for lacing the cover to the back frame 15 as shown in FIG. 3. Arm flaps 50 and 50a project from the cover at an area approximately under the armpits of the pilot. These arm flaps are fastened to the upper arm restraints 20 and 20a respectively, by the fasteners 51 and 51a (FIG. 1).

Sewn to the back of the cover so as to align with the upright stringers 16 are lacing tabs 58 (FIG. 3). They come in pairs and are located immediately adjacent either side of the upright stringers at various points. The lacing tabs 58 are provided with eyelets which receive lacing 49 utilized to secure the cover to the back frame.

Figure 4:
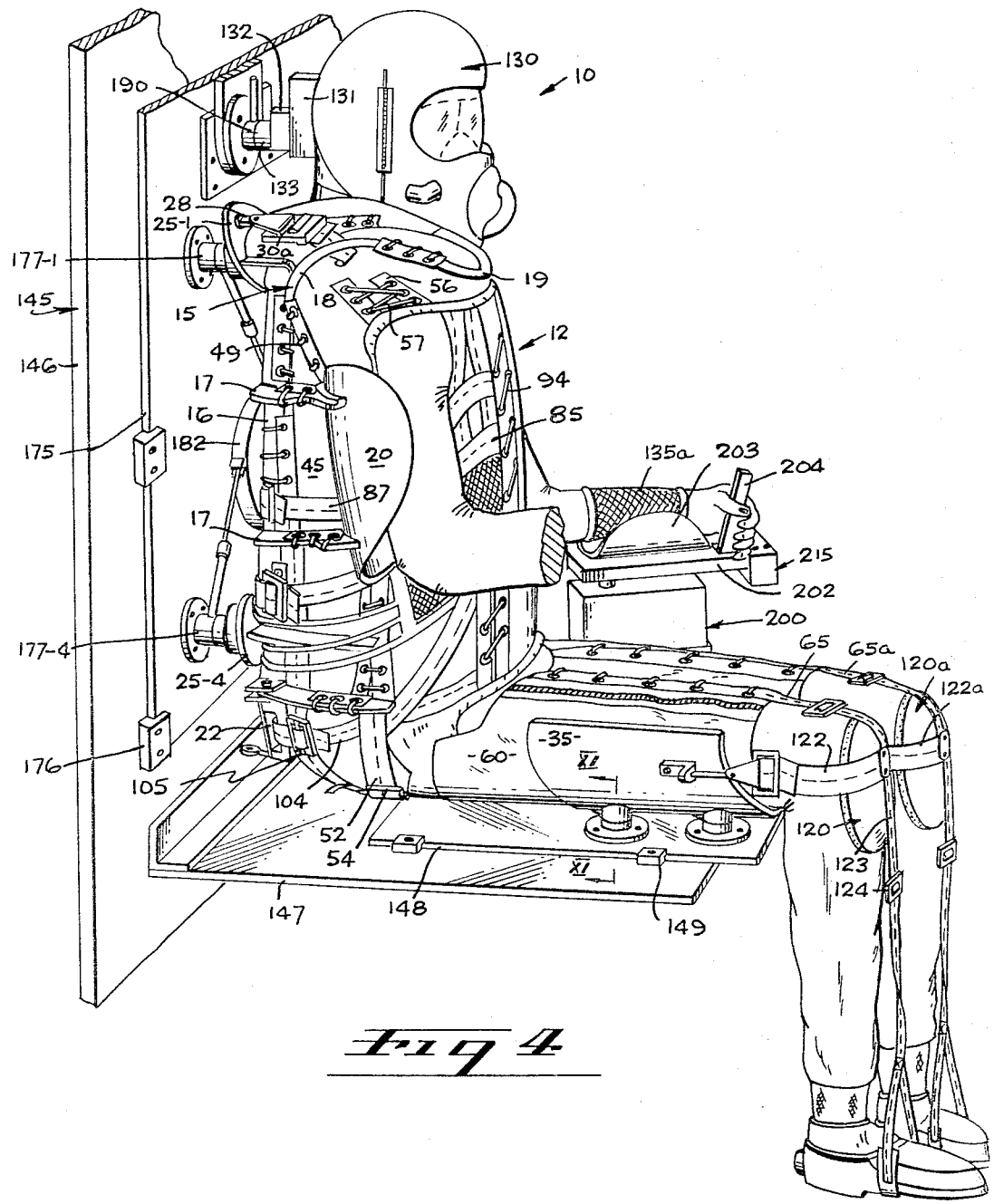
FIG. 4 is a perspective view of the pilot restraint suit in combination with the main portion of the body support structure, portions of which are removed, and showing the manner and points of connection between the restraint suit and the body support structure.

As best shown in FIG. 4, the cover 45 has shoulder draw structure 56 which may be gathered by lacing 57. This provides a fitting arrangement for the shoulders so that the cover may be drawn tight against the pilot in the area.

A seat flap 50 extends beyond the bottom edge of the back cover 45 and provides support for the buttocks of the pilot as shown in FIGS. 3 and 4.

Sewn to the back cover 45 are five vertical seat straps 52 (FIG. 3). These straps project below the bottom edge of the cover. The two outermost straps connect to three bar fasteners 54 which in turn carry the ends of a horizontal seat strap 53 connected therebetween. The extending portions of the vertical seat straps are provided with three bar fasteners 55. This arrangement provides for sitting height adjustment by shortening or lengthening the vertical seat straps to facilitate fitting the suit to a pilot. The lower extremities of the intermediate vertical seat straps are sewn to a thigh cover 60 now to be described.

The thigh cover 60 has a web portion 61 to which the vertical seat straps are sewn, and which extends generally across the lower buttocks and upper thigh portion of the pilot. Woven integral with the web portion 61 are short legs 62 and 62a. The short legs 62 and 62a are approximately three-fourths the length of a pilot's thigh. They are split and provided with lacing 63 and 63a which can be loosened or tightened to fit the thigh of the particular pilot. The short legs 62 also have paralleling zippers 64 and 64a. The zipper arrangement provides a means of putting on and taking off the thigh cover rapidly once the short leg has been laced to the proper size.

Knee restraint straps 65 and 65a are sewn to the short legs 62 and 62a adjacent the lacing 63 and 63a. These straps may be halved and joined by buckles for varying the length of the strap. These straps are connected with components of the knee restraint assemblies 120 and 120a to be explained.

The upper bladder 68 (FIG. 1) has the general configuration of a half jacket. It is cut to generally match the back cover 45, having shoulder strap apertures 69 and 69a alignable with the cover shoulder strap apertures 47 and 47a respectively. It is constructed from a material such as rubber and has vertically directed ribs 71 to stiffen the structure and help it retain its shape. An inflating tube 72 is connected to the bladder in a conventional manner to provide for inflation. The pilot has the capability of inflating or deflating the bladders 68 and 75 by a valving arrangement located next to the left hand grip, this structure to be explained hereinafter. Although air is normally used to inflate the bladder, it is to be understood that within the broadest aspect of the invention a material such as oil or plastic foam might also be utilized.

An H-shaped shoulder harness 73 is connected at the shoulder points of the upper edge and intermediate the ends on the side edges of the upper bladder 68. The harness cross member may be provided with a buckle to assist in fitting. A waist band 74 is connected to the base of the upper bladder and may also be provided with a buckle for fitting purposes. The bladder when inflated automatically fits to the posterior portion of the body torso, thus eliminating the necessity of a contoured couch as in prior art restraint systems. Although the upper bladder 68 is shown as a separate member, it is to be understood that within the broadest aspect of the invention the bladder might be formed by vulcanizing a sheet over the back cover 45.

The lower bladder member is in the shape of half shorts. It has a seat portion 76 from which half legs 78 and 78a project. Ribbing 77 extend through the legs and seat to lend rigidity and form to the structure. A belly band 80 is connected to the side edges along the top of the seat portion 76. It has either a buckle or elastic connectors to provide for fitting. Each half leg has a leg band 81 and 81a respectively adjacent the lower portion. They are also provided with buckles or elastic connectors to facilitate fitting. A tube 79 communicates with the interior of the bladder to provide for inflation thereof. The lower bladder like the upper bladder when inflated automatically contours or fits to the shape of the pilot.

The restraint bib 85 (FIGS. 1 and 2) is designed to fit about the shoulders, chest, and rib cage of a torso anterior. It also operates as a means for assembling the various suit components and attaching them to the pilot's body.

The upper portion of the restraint bib 85 consists of shoulder straps 86 and 86a. These straps extend downwardly to a point approximate the nipple line and are sewn at this point to chest straps 87 and 87a which are directed laterally with respect thereto. Mesh-like rib panels 90 and 90a are sewn to the bottom of the chest straps 87 and 87a. Rib straps 91 and 91a are sewn or otherwise attached to the outer edges of the rib panels 90 and 90a. The restraint bib 85 is separated vertically down the middle and gathered together by lacing 94. The lacing may be loosened or tightened for fitting purposes.

As shown in FIG. 3, the shoulder straps 86 and 86a pass through the bladder apertures 69 and 69a and cover apertures 47 and 47a, and then connect to the three bar fasteners 30 and 30a respectively. The chest straps 87 and 87a partially surround the back frame 15 and connect to buckles 88 and 88a. These buckles are interconnected by the joiner straps 89. The rib straps 91 and 91a also partially surround the lower portion of the back frame 15 and connect with the rib buckles 92 and 92a. These buckles are in turn interconnected by the rib joiner straps 93.

The pelvic restraint 100 is utilized to restrain the abdominal section of the pilot. It has a mid section 101 which is connected by lacing 103 and 103a at either side to pelvic Y-straps 104 and 104a. As in other instances, the lacings 103 and 103a are utilized for fitting. FIG. 3 shows the pelvic straps 104 and 104a fastened to the pelvic strap buckles 105 and 105a. These buckles are tied together by pelvic joiner strap 106 which is positioned and held with respect to the back frame 15 by the strap slots 22 and gates 23, previously explained. The pelvic restraint 100 may be used in this manner or in combination with a conventional G-suit in which case the mid section 101 is sewn directly to a G-suit 110. The G-suit 110 is provided with a zipper 107 which provides a means for quickly putting on and taking off the combination once it is laced to fit properly. It has inflatable legs 111 and 111a to control pooling of the blood in the limbs. The legs 111 and 111a are supplied with air or inflatable fluid by the lines 112 and 112a which communicates with the main supply line 113.

The knee restraint assemblies 120 and 120a are best illustrated in FIGS. 2 and 4. The basic elements of the restraint assemblies are the restraint caps 121 and 121a. These elements are of a shallow dish-shape conforming generally to the shape of a knee cap. The inner surfaces are padded with a material such as sponge rubber to prevent bruising the pilot's knee. Fastened to the knee restraint caps are stirrup straps 122 and 122a. The ends of the straps are connected to the stirrups which are suspended from the thigh supports 35 and 35a. The knee restraint straps 65 and 65a are also attached to the knee restraint caps 120 and 120a. These straps project below the knee restraint caps and connect with the knee restraint buckles 124 and 124a. They in turn connect with straps 123 and 123a which are fastened to boot straps 125 and 125a respectively. The boot straps 125 and 125a fit about the instep of the pilot's boots. Both the knee restraint straps 65 and 65a, and the stirrup straps 122 and 122a, can be lengthened and shortened to provide for variation in limb size of the pilot.

The helmet 130 (FIGS. 2 and 4) is not directly connected with the restraint suit structure described to this point; however, it forms an important part of the restraint system. The helmet is provided with a guide 131 having a T-shaped track on the back thereof. A slide 132 is operative in the track 131 and guided thereby. A head connector 133 is fastened to the slide and projects from the rear of the helmet. The head connector 133 is substantially identical in design to the back connector 25-1 and will not again be explained in detail. An essential feature of the helmet is that it have a molded face mask of resilient material. This is necessary to protect the pilot's face under bask-to-chest forces. The mask may be of the type than can be inserted or formed integral with the face of the helmet.

The forearm restraint cuffs 135 and 135a are similar in design. Therefore only the cuff 135 will be fully described. The cuff 135 is composed primarily of material of large mesh 136 bound along its edges by a strong cloth binding. The mesh 136 embodies the "Chinese magic chain principle" wherein the tension of the cuff around the forearm increases with an increase in the applied axial load. The forearm restraint cuff 135 is split lengthwise and laced together with lacing 137. The lacing 137 may be tightened or loosened to adapt for different sized pilots. The forearm restraint cuff 135 also has a zipper 139 lengthwise so that the cuff may be put on and taken off rapidly once it has been laced to the proper size. A forearm strap 140 has its ends secured to diametrically opposite points on the back binding of the cuff mesh 136. A forearm strap cinch 141 is placed in the loop formed by the strap to provide for lengthening and shortening the strap. The forearm strap 140 passes through the eye of a hasp 142. The hasp 142 has a coupler pin aperature 143 which is adapted to receive a coupler pin, to be explained more fully hereinafter. The above described suit components comprise the restraint suit 12 per se and cooperate with the body support structure 145, now to be described, which together constitutes the restraint system 10.

The body support structure 145 (FIGS. 4 and 7) is essentially a chair-like structure having an upright back portion 146 and a laterally directed seat portion 147. Although not shown, the structure being conventional, the body support structure 145 may be oriented in a space capsule or ship so that the deceleration and acceleration vectors are transverse to the spinal axis of the pilot to maximize the individual's tolerance to acceleration.

The seat portion 147 has a fitting plate 148 that is movable toward and away from the back 146. The movement of the fitting plate 148 is directed by L-shaped clamp guides 149 which are fixed to the seat 147 and overlap the top of the fitting plate. As best shown in FIG. 10, a traveling nut slot 150 is formed in the seat 147. The traveling nut 151 is fixed to the fitting plate 148 by conventional screw fasteners. It is threaded on a lead screw 153 which is journalled in a pillow bracket 152 suspended from the bottom of seat 147. Rotation of the lead screw 153 results in movement of the traveling nut 151 and the fitting plate 148 to which it is connected. This arrangement provides means for moving the fitting plate to adjust for different sized pilots.

Fixed to the top surface of the fitting plate 148 are the seat receptacles 154-1, 154-2, 154-3 and 154-4. As all of the seat receptacles are substantially identical, only the seat receptacle 154-1 will be explained in detail.

FIG. 11 best illustrates the seat receptacle 154-1. It is a hollow member having a tapered interior 155 and release pin guide apertures 156 formed transversely through the receiving portion thereof. Also fixed to this portion is a spring housing 157 which contains a return spring 158 of the coil type. A release pin 159 is directed by the release pin guide apertures 156 and may be withdrawn into the spring housing 157 against the pressure of the return spring 158 which acts against a shoulder formed on the release pin. The male plug 40 of connector 39-1 fixed to the thigh support 35 is received by the receptacle opening 155. The release pin 159 projects through the release pin aperture 41 to latch the two members together.

Release cables 160, 161, 162 and 163 (FIG. 7) are connected respectively to the release pins of seat receptacles 154-1, 154-2, 154-3 and 154-4. The release cables 162 and 163 are directed over a pulley block assembly 166 and the release cables 160 and 161 over a pulley block assembly 169. All of these cables are fastened to a splicer 164 which is located behind the pulley block assembly 169. A main release cable 165 is fixed to the splicer 164 and directed over a pulley, through a cable length adjuster 172 fixed to the back 146, directed through another pulley system and fastened to a release drum to be explained more fully hereinafter. The cable length adjuster 172 is of conventional design and is utilized to take up slack in the cable or let out cable depending upon the direction in which the fitting plate 148 is moved.

The body support back portion 146 has a fitting plate 175 which is basically similar to the seat fitting plate 148. Back fitting plate guide clamps 176 are secured to the back 146 and guide the fitting plate 175 in its movement toward and away from the seat 147. A fitting plate actuator mechanism 174 is identical to that utilized to move the seat fitting plate 148 and will not again be explained in detail. It might be noted that the adjustor (FIG. 10) could be actuated by servosystem or other automatic devices to turn the screw. Back receptacles 177-1, 177-2, 177-3 and 177-4 are fixed to the face of the back fitting plate 175. Since all of the back receptacles are substantially identical in construction to the seat receptacle 154-1, additional description is omitted.

Release cables 178, 179, 180 and 181 are connected respectively to the release pins of back receptacles 177-1, 177-2, 177-3 and 177-4. The other ends of these release cables are fixed to a release drum 182 which is rotatably mounted on the fitting plate 175. The main seat release cable 165 is also fixed to the release drum 182 as previously mentioned. A release lever 183 is fixed to the release drum 182 and has a handle which may be utilized for manually rotating the release drum 182 and thereby simultaneously withdrawing the release pins from all of the seat and back receptacles to unlatch the male plugs engaged therein. A return spring 185 is connected between the release lever 183 and an anchor block 184 carried by the fitting plate 175.

Release may be accomplished by power means in the form of a pneumatic or hydraulic actuator 186. The actuator 186 is pivotally mounted at one end to the anchor block 184 and has the working member thereof pivotally connected to a toggle 187 which in turn is pivoted on the release lever 183.

A head receptacle 190 is also fixed to the back fitting plate 175 and is located above and intermediate the back receptacles 177-1 and 177-2. The head receptacle 190 is similar in design to the other receptacles. A manual release bar 192 is fixed to the release pin of the head receptacle to allow the pilot to manually release the helmet from its attachment with the fitting plate. Release may also be accomplished by power means in the form of a pneumatic or hydraulic actuator 194 which is carried by the back fitting plate 175 and has its working elements connected directly to the release pin of the head receptacle.

The body support structure 145 includes arms 200 and 200a. The arm 200a has been cut away in FIG. 7 to fully reveal the seat release and receptacle structure; however, it is substantially similar to the arm 200. The arm 200 has a box-like base structure 201 which is pivotally mounted on the seat 147 in a conventional manner. Elevated above the base 201 is a plate-like platform 202 which is located substantially parallel with respect to the seat 147. A trough-like arm rest 203 with its upper edges tapered toward either end is fixed to the platform 202. It restrains movement of the forearm in directions lateral to the length dimension of the seat 147. A control 204 is located forward of the arm rest 203. Although the control 204 is shown as being utilized for releasing the forearm restraint mechanism (FIG. 8), it is to be understood that within the broadest aspect of the invention the control may be of the multiple movement variety whereby it may be utilized to control roll and pitch of the spacecraft.

Valve box 215 is carried by an arm rest platform 202. It has upper and lower bladder control buttons 216 and 217 respectively, as well as actuator control buttons 218 and 219 for the actuator 186 and 194 respectively. The valve box is connected to the bladders and actuators in a conventional manner.

Also forming a part of the body support system is the foot pedestal 205. It has a central column 213 which supports at either side foot pedals 206 and 208. The pedals are connected to yaw control mechanism 212 also supported by the column 213, this structure being of conventional design. The pedals 206 and 208 have a sole and heel supporting surface, and are designed to encompass the upper heel and the sides of the shoes leaving the top toe end open. Pedal covers 207 and 209 are pivotally connected to one of the sides of each of the pedals 206 and 208 and are adapted to cover the upper toe area of the pilot's shoes or boots. Each cover is provided with a latch for fixing the covers in place over the pilot's boots, the arrangement being shown by the structure 210 on pedal 208. A foot latch release 211 includes cables which are connected to the latch pins on each foot pedal and to a release ring 214 located at the top of the column 213 which is positioned between the knees of the pilot.

The forearm restraint mechanism 225 is identical for both forearms, the details of the mechanism being shown for the left forearm in FIGS. 8 and 9. A fulcrum 226 is fixed to the body support back 146. A pendulum 227 is pivoted on the fulcrum 226. The lower end of the pendulum 227 carries a weight 228 for counterbalancing the tendency of the pilot's arm to move in a forward direction away from the body due to back-to-chest force applications. Also carried by the fulcrum 226 is a viscous damper 229 having an operator 230 connected to the pendulum 227 at a point above its pivotal connection with the fulcrum. The damper prevents sudden movements of the pendulum 227 which would result in jerking the arm of the pilot. The restraint wire 231 is fixed to the top of the pendulum 227 and directed over a pulley system 232 carried by the back 146 and to a coupler 233. The coupler has a hollow body 234 with a partially split head 235. The split head 235 has a coupler pin aperture 236 formed transversly therethrough, the coupler pin aperture being centered with the interior of the housing. A coupler pin 237 is movable through the coupler pin aperture 236 and hasp aperture 143 to latch the hasp 142 to the coupler. A spring 238 located within the housing operates against a shoulder formed on the release pin 237 to urge it into the latching position. The wire 239 is connected between the coupler release pin 237 and the control 204. The forearm restraint cuff 135a is thus connected to the restraint mechanism via the forearm restraint strap 140, the hasp 142 which is engaged by the coupler, and the restraint wire 231 which joins the coupler 233 with the pendulum 227.

*Assembly and operation*

The manner in which the restraint suit 12 is assembled can best be seen from FIGS. 1 and 3. The seat straps 52 are sewn to the back cover 45, and the intermediate seat straps sewn to the thigh cover 60. The back cover 45 is laced to the back frame 15 by lacing 49 as shown in FIG. 3. The arm flaps 50 and 50a are fixed to the upper arm restraints 20 and 20a by the fasteners 51 and 51a. The cover legs 62 and 62a are fixed to the thigh supports 35 and 35a by the fasteners 36 and 36a. This constitutes the basic assembly of the rigid back support structure and the rigid thigh support structure which normally needs to be done only after manufacture or disassembly and assembly for repair.

The attirement of the restraint suit on the pilot will now be explained. This procedure takes place each time the pilot wears the restraint suit. Initially, the pilot wears a suit of long underwear. If a combined pelvic restraint 100 and G-suit 110 are utilized these items are next put on (otherwise, the pelvic restraint may be attached after the bib restraint). Assuming, however, that a G-suit is to be used, the zipper 107 is unzipped. The pilot's limbs are passed through the legs 111 and 111a and the zipper 107 rezipped. The proper fit may be obtained by tightening or loosening the lacing 103 and 103a.

The pilot then puts on the upper bladder 68. This is accomplished in an obvious manner, the harness 73 fitting over the pilot's shoulders and under the arms, the cross piece fitting across the pilot's chest. The waist band 74 fits about the waist. The lower bladder is then put on, the belly band 80 fitting about the pilot's abdomen and the leg bands 81 and 81a over the top of the pilot's thighs.

The next step is to connect together the back frame 15 and the restraint bib 85. The back frame and thigh support assemblies are supported by the pilot's shoulders. The restraint bib shoulder straps 86 and 86a may be started in the three bar fasteners 30 and 30a respectively. It will hang from the pilot's shoulder while the chest straps 87 and 87a are connected to the chest strap buckles 88 and 88a which have previously been connected to the joiner straps 89. The rib straps 91 and 91a are then engaged with the rib strap buckles 92 and 92a which have previously been interconnected with the rib joiner straps 93. If it is necessary to adjust the lacing 94 to obtain a proper fit this can now be accomplished. The shoulder restraint straps, the chest restraint straps, and the rib restraint straps may be tightened as necessary.

The pelvic restraint straps 104 and 104a are now connected to the pelvic strap restraint buckles 105 and 105a. The pelvic joiner strap 106 is connected between these buckles. The clamp screws 24 are loosened to open the gates 23 and allow the pelvic joiner strap 106 to fit within the strap slots 22 and 22a. The gates 23 are then closed and the clamping screws tightened. The pelvic restraint straps may be tightened as necessary.

The zippers 64 and 64a on the thigh covers are opened and the covers 62 and 62a placed about the pilot's thigh. The zippers are then closed. The lacing 63 and 63a may be adjusted to provide a proper fit. The intermediate seat straps may be lengthened or shortened to properly position the thigh supports 35 and 35a.

The knee restraints are next attached. The three bar fastener straps 122 and 122a are engaged with the respective stirrups on the thigh supports 35 and 35a. The knee restraint straps 65 and 65a are fastened to the restraint caps 120 and 120a and to the strap clasps 124 and 124a. The boot straps 125 and 125a which are carried by the stapes 123 and 123a are fitted about the instep of the pilot's boots.

The forearm cuffs 135 and 135a are put on by opening the zippers, placing the cuffs around the forearm and closing the zippers. If necessary, the lacing 137 may be altered to obtain the desired fit.

The face of the helmet 130 is hinged and opens up to allow helmeting of the pilot. When the helmet is on the face mask is closed and latched.

The pilot is now ready for attachment to the body support structure 145. The release lever 183 is operated either manually or by the actuator 168 to withdraw the release pins from the seat receptacles 154–1 through 4, and the back receptacles 177–1 through 4. The foot pedal covers 207 and 209 are also opened by the foot pedal release 211. The pilot then sits down so that the male plugs of thigh connectors 39–1, 39–2, 39–3 and 39–4 are received by the seat receptacle 154–1, 154–2, 154–3 and 154–4 respectively. The male plugs of the back connectors 25–1, 25–2, 25–3 and 25–4 are next engaged with the back receptacles 177–1, 177–2, 177–3 and 177–4. To do this it may be necessary to move the fitting plate 148 in or out, and the back fitting plate 175 up or down. As shown in FIG. 10, this is accomplished on the seat 147 by rotating the lead screw 153 which causes the nut 151 carried therethrough to move the seat fitting plate 148. Actuator 174 may be operated similarly to move the back fitting plate 175. When the proper fit has been obtained, the lever 183 is released. It is reinstated to its original position by return spring 185. The release pins associated with each of the back and seat receptacles are extended by their respective springs, latching the male plugs in the receptacles in a manner similar to that shown in FIG. 11. During this fitting procedure it may be necessary to let out or take up the seat main release cable 165, this being accomplished by the cable length adjuster 172. At this point it may also be necessary to vary the stirrup straps and knee restraint straps to assure that the restraint caps 120 and 120a are directly positioned over the pilot's knee caps.

The pedal covers 207 and 209 are closed over the toes of the pilot's boots and the covers latched.

The helmet plug is next connected to the head receptacle. The release pin of the head receptacle 190 is withdrawn and the male plug of the helmet connector 133 inserted in the head receptacle 190. As previously explained, the slide 132 is movable on the track of guide 131 which provides means for aligning the head connector 133 with the head receptacle 190. Upon release of the manual release 192 or the actuator 194 the spring urged release pin of head receptacle 190 latches the head connector to the head receptacle.

The left forearm is connected to the restraint system by operating control 204 which withdraws coupler release pin 237 and allows the hasp 142 to be inserted in the partially split coupler head 235. When the control is released the spring 238 extends the coupler release pin 237 which passes through the hasp aperture 143 latching it to the coupler. The right forearm restraint, not shown, is assembled in a similar manner. Egress of the pilot from the body support structure 145 is in the reverse manner of the ingress or attachment described above. Likewise, the restraint suit 12 per se is taken off in the reverse manner.

At this point the upper and lower bladders may be fully inflated. They will automatically form about the pilot providing a fit equal or superior to that obtainable by a contoured couch. The upper bladder together with the rigid back frame provides adequate support and cushioning due to forces applied in the chest-to-back direction. Likewise, the lower bladder together with the rigid thigh supports provide adequate support and cushioning for the pilot when subjected to chest-to-feet forces. The bib restraint, pelvic restraint, and knee restraints function to restrain the pilot when subjected to forces in the back-to-chest direction. The forearm restraint wires are of sufficient length that the pilot can reach and open a latched door in the helmet frontpiece should the pilot need to breathe cabin air or regurgitate and need to remove the refuse. This arrangement also allows sufficient freedom for the pilot to operate many of the manual controls. On the other hand, the counterweighted pendulum counter-balances the mass of the pilot's forearm and hand when subjected to forces in the back-to-chest direction. The viscous dampers reduce the jostling of the arms during rapid changes in the applied force field. Once the pilot has landed, the coupler release allows the forearm to be completely freed from the forearm restraint system to provide maximum freedom of movement.

The pilot may quickly disconnect himself from the body support structure. This can be accomplished in four movements. The arms can be released from the forearm restraint system by withdrawing the coupler release pins. The feet may be released by actuating the cover release which allows the pedal covers to be opened. The helmet is disconnected from the seat fitting plate by the manual or pneumatic actuator which withdraws the head receptacle release pin. This may also be accomplished in flight to give the pilot some freedom of movement of the head and reconnected before landing. By actuating the release lever the release pins of the back and seat receptacles are simultaneously withdrawn. The pilot is then free to move away from the body support structure.

From the above description of this restraint system it is clear that it is universally adaptable to fit most any size pilot. If a great variation in pilot size is encountered, the restraint suit per se can be made in small, medium and large sizes all of which can be used with the described body support structure. The suit can be attired quickly. The quick disconnect system provides a means of rapid ingress and egress to and from the body support structure as well as the capsule. This restraint system is more economical than existing systems since it is not necessary to fit each individual pilot especially. The system gives a maximum degree of maneuverability for the pilot as well as adequate protection in all force fields.

Obviously, many modifications and variations of the present invention are possible in the light of the above teachings. It is, therefore, to be understood that within the scope of the appended claims the invention may be practiced otherwise than as specifically described herein.

What is claimed is:

1. A combination universal pilot restraint suit and posture positioning means therefor comprising; body support means having back and seat support means; receptacles fixed to said back and said seat support means; suit means attirable by a pilot; connectors fixed to said suit means alignable with said receptacles and engageable therewith; and latching means for releasably fixing said connectors in said receptacles to restrain said pilot; and carrier means having guided movement on said back and seat means, said receptacles being fixed to said carrier means and being positionable to receive the connectors fixed to said suit means to fit differently sized pilots.

2. A combination universal pilot restraint suit and posture positioning means therefor as in claim 1 wherein said suit means includes helmet means and helmet connector means, helmet receptacle means fixed to said back carrier means receiving said helmet connector means, and latching means for releasably fixing said helmet to said helmet receptacle means for restraining said pilot's head.

3. A combination universal pilot restraint suit and posture positioning means therefor as in claim 2 wherein a guide having a track is fixed to said helmet means, said connector means includes a slide, and said slide is movable in said track whereby said helmet connector means is positionable for differently sized pilots.

4. A combination universal pilot restraint suit and posture positioning means therefor comprising; a body supporting member having back and seat portions, said back and seat portions having fitting plates movable thereon normally of each other, back receptacles secured to said back fitting plate, seat receptacles fixed to said seat fitting plate, attirable suit means, connectors secured to said suit means engageable with said back and seat receptacles, means for moving said back and seat fitting plates for aligning said back and seat receptacles with said connectors to provide for differently sized pilots, pin means for latching said connectors in said receptacles, and operator means connected to said pin means for simultaneously releasing said pin means to provide rapid ingress and egress of said pilot.

5. A combination universal pilot restraint suit and posture positioning means therefor as in claim 4 including drum means, said operator means includes cables fixed to said pin means and to said drum means, lever means for rotating said drum means to withdraw said pin means and release said connectors from said back and seat receptacles, power means and manual means for withdrawing said pin means, and resilient means for extending said pin means for latching.

6. A combination universal pilot restraint suit and posture positioning means therefor as in claim 4 wherein said suit means includes helmet means, helmet receptacle means fixed to said back fitting plate, connector means, slide means connected to said connector means, guide means having a track, said guide means fixed to the back of said helmet means, said slide being movable in said track to provide for pilot size variation, said connector means being engageable with said helmet receptacle, pin means for latching said helmet connector means to said helmet receptacle, manual and power means for withdrawing said pin means, and resilient means for extending said pin means for latching.

7. A combination universal pilot restraint suit and posture positioning means therefor comprising; body supporting means, suit means including a back frame, a cover secured to said back frame, thigh support means suspended from said cover, inflatable structure positionable between said cover and thigh support means and a pilot's body; chest and pelvic restraint means tied to said back frame, thigh restraint means fastened to said thigh support means; and attachment means formed integral with said body support means and said back frame and thigh supports, and inter-engageable to restrain said pilot relative to said body support means.

8. A combination universal pilot restraint suit and posture positioning means therefor as in claim 7 wherein said attachment means includes releasable latching means to provide rapid detachment of said suit from said body support means.

9. A combination universal pilot restraint suit and posture positioning means therefor comprising; body supporting means, suit means including rigid structural means, inflatable means positioned between said rigid structural means and a pilot, restraint means for fixing said rigid structural means to said pilot, and attachment means formed integral with said body support means and with said rigid structural means said attachment means of said body support means and said rigid structural means being inter-engageable to restrain said pilot relative to said body support means.

10. A combination universal pilot restraint suit and posture positioning means therefor comprising; body supporting means; suit means including a back frame; said back frame having inter-connected horizontal and vertical members with overlapping shoulder portions all generally contoured to the posterior of a torso; a cover laced to said back frame; an upper bladder generally contoured to the posterior of a torso; a bladder harness for fixing said bladder relative to said torso, a thigh cover, seat straps fixed between said back cover and said thigh cover, rigid thigh supports fixed to said thigh cover, a lower bladder generally contoured to the buttocks and thighs, means for fixing the lower bladder to the pilot, a bib restraint surrounding the chest and being strapped to and about said back frame superimposed upon said upper bladder, a pelvic restraint surrounding the pelvis and strapped about said back frame, said thigh cover having legs closing about the lower bladder and thighs, receptacles carried by said body support, connector means formed integral with said back frame and thigh supports, said connector means being received by said receptacles, and latching means for fixing said connector means in said receptacles to restrain said pilot.

11. A combination universal pilot restraint suit and posture positioning means therefor as in claim 10 wherein said thigh supports have stirrups, knee restraint stirrup straps joining said stirrups and knee restraint caps, and straps between said knee restraint caps and pilot footwear.

12. A combination universal pilot restraint suit and posture positioning means therefor as in claim 10 wherein said thigh cover legs have lacing to provide for variation in size of pilot thighs, said thigh cover legs having zippers to provide for quick ingress and egress after lacing to the proper size.

13. A combination universal pilot restraint suit and posture positioning means therefor as in claim 10 wherein said pelvic restraint has lacing to provide for variation in size of a pilot's lower torso, said pelvic restraint having a zipper to provide for quick ingress and egress after lacing to the proper size.

14. A combination universal pilot restraint suit and posture positioning means therefor as in claim 10 wherein certain of said seat straps have buckles for lengthening and shortening the straps to provide for variation of pilot size.

15. A combination universal pilot restraint suit and posture positioning means therefor as in claim 10 wherein said suit means includes forearm restraints; said forearm restraints being cuff-like, lacing to provide for variations in size of forearm restraints, and zippers to provide for quick ingress and egress after lacing to the proper size.

16. A combination universal pilot restraint suit and posture positioning means therefor as in claim 15 wherein counterbalancing means are connected to said forearm restraints to limit movement of the hands and forearms in the back-to-chest direction.

17. A combination universal pilot restraint suit and posture positioning means therefor as in claim 16 wherein control means are positioned between said forearm restraints and said counterbalancing means, said control means including quick release mechanism whereby the pilot's arms can be released from the restrictions of said counterbalancing means for free movement to perform necessary functions.

18. A combination universal pilot restraint suit and posture positioning means therefor comprising; body support means; restraint suit means; said restraint suit means including a helmet, a cushioned rigid back structure; chest and pelvic restraints securable to said rigid back structure; cushioned thigh supports suspended from said rigid back structure; knee restraints slung from said cushioned thigh supports, forearm restraints; releasable attachment means between said body support means; said helmet, cushioned back structure, thigh supports and forearm restraints; operator means for simultaneously releasing said cushioned back structure and thigh support attachment, and separate operator means respectively for releasing said helmet attachment and forearm attachment to provide both rapid egress and freedom of movement.

19. A combination universal pilot restraint suit and posture positioning means therefor as in claim 18 wherein said body support means includes foot restraint means, said foot restraint means having gate means for holding a pilot's feet, and latch means for releasing said gate means to provide rapid egress of a pilot.

20. A universal pilot restraint suit comprising; a rigid back frame generally contoured to the posterior of a torso; a cover fixed to said back frame, rigid thigh supports suspended from said cover and generally contoured to the posterior of thighs; upper and lower bladder means overlying said rigid back frame and rigid thigh supports to cushion a body forced in the chest-to-back and chest-to-feet direction respectively, a bib and pelvic restraint fastenable to said back frame to restrain a body forced in the back-to-chest direction.

21. A universal pilot restraint suit as in claim 20 wherein said rigid back frame is constructed from inter-connected mesh-like upright and lateral light metal stringers; certain of said lateral stringers projecting on either side and having upper arm restraints secured thereto; said back frame having overlapping shoulder projections for restraining a body forced in the back-to-chest direction, and attachment members located at different points formed integral with said back frame adapted for attachment to a body support member.

22. A universal pilot restraint suit as in claim 20 wherein said bib restraint has lacing to provide for variation in chest size of a pilot, over shoulder straps fastenable to said rigid back frame, and chest and rib straps fastenable about said rigid back frame.

23. A universal pilot restraint suit as in claim 20 wherein said pelvic restraint has lacing to provide for variation in pilot pelvic size, said pelvic restraint including a G-suit having a zipper to provide rapid ingress and egress upon lacing to proper size, and pelvic restraint straps fastenable about said rigid back frame.

24. A universal pilot restraint suit as in claim 23 wherein said pelvic restraint has formed integrally therewith a G-suit, said G-suit having pressure regulating means to prevent pooling of blood in a pilot's limbs.

25. A universal pilot restraint suit as in claim 20 wherein said rigid thigh supports include thigh covers, said thigh covers having lacing to provide for variation in pilot limb size, a zipper in each thigh cover to provide for rapid ingress and egress of the pilot, and attachment members located at different points formed integral with said rigid supports adapted for attachment to a body support member.

26. A universal pilot restraint suit as in claim 25 wherein said rigid thigh supports have stirrups, cushioned cap-like knee restraints, stirrup straps connected between said cap-like knee restraints and said stirrups, and straps connected between said cap-like knee restraint and pilot boots.

27. A universal pilot restraint suit as in claim 20 wherein said rigid thigh supports are suspended from said cover by seat straps, said seat straps having means for shortening and lengthening to provide for variation in pilot size between torso and thighs.

28. A forearm restraint adapted for use with pilot restraint mechanism having body support means including, arm rests comprising; a cuff adapted to surround a pilot forearm, a damped counterweight associated with said body support means, and means connecting said cuff to said counterweight to restrain movement of the hand and forearm in the back-to-chest direction.

29. A forearm restraint adapted for use with pilot restraint mechanism having body support means including, arm rests as in claim 28 wherein said cuff has lacing to provide for variation in pilot forearm size, and said cuff having a zipper to provide rapid ingress and egress after lacing to proper size.

30. A forearm restraint adapted for use with a pilot restraint mechanism having body support means including, arm rests as in claim 28 wherein said cuff is normally positioned on said arm rest, a pendulum, a weight attached to one of said pendulum, said pendulum being pivoted on said body support, a connection between the other end of said pendulum and said cuff; a coupler in said connection, and operator means between said coupler and said arm rest to separate said coupler and break said connection whereby said forearm is freed from said connection, and a viscous damper carried by said body support and fastened to said lever being operative to damp the movement of said lever.

References Cited by the Examiner
UNITED STATES PATENTS

| | | | |
|---|---|---|---|
| 1,298,615 | 3/1919 | Wilkinson | 297—389 |
| 1,616,349 | 2/1927 | Cagle | 297—389 |
| 1,640,270 | 8/1927 | Furman. | |
| 2,148,953 | 2/1939 | Meissner | 297—389 |
| 2,495,316 | 1/1950 | Clark | 128—1.01 |
| 2,638,293 | 5/1953 | Lindstrom | 244—122 |
| 3,020,011 | 2/1962 | Beem | 244—141 |

RICHARD A. GAUDET, *Primary Examiner.*

W. E. KAMM, *Assistant Examiner.*